US008549226B2

(12) United States Patent
Ari et al.

(10) Patent No.: US 8,549,226 B2
(45) Date of Patent: Oct. 1, 2013

(54) PROVIDING AN ALTERNATIVE CACHING SCHEME AT THE STORAGE AREA NETWORK LEVEL

(75) Inventors: Ismail Ari, San Jose, CA (US); Richard H. Henze, San Carlos, CA (US); Melanie Gottwals, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1804 days.

(21) Appl. No.: 10/846,455

(22) Filed: May 14, 2004

(65) Prior Publication Data

US 2006/0026229 A1    Feb. 2, 2006

(51) Int. Cl.
*G06F 12/08* (2006.01)

(52) U.S. Cl.
USPC .......................................... 711/122; 711/117

(58) Field of Classification Search
None
See application file for complete search history.

(56) References Cited

U.S. PATENT DOCUMENTS

| 5,924,116 | A  | * | 7/1999  | Aggarwal et al. | 711/122 |
|-----------|----|---|---------|-----------------|---------|
| 6,253,289 | B1 | * | 6/2001  | Bates et al.    | 711/137 |
| 6,272,622 | B1 | * | 8/2001  | Han et al.      | 712/237 |
| 6,463,509 | B1 | * | 10/2002 | Teoman et al.   | 711/137 |
| 6,513,097 | B1 |   | 1/2003  | Beardsley       |         |
| 7,472,231 | B1 | * | 12/2008 | Cihla et al.    | 711/144 |
| 2001/0049773 | A1 | * | 12/2001 | Bhavsar      | 711/147 |
| 2002/0103975 | A1 | * | 8/2002  | Dawkins et al. | 711/133 |
| 2003/0191901 | A1 |   | 10/2003 | Hill           |         |
| 2004/0039886 | A1 |   | 2/2004  | Christofferson |         |
| 2004/0054860 | A1 | * | 3/2004  | Dixit et al.   | 711/160 |
| 2005/0108478 | A1 | * | 5/2005  | Holloway et al. | 711/119 |

FOREIGN PATENT DOCUMENTS

| EP | 0509676    |    | 10/1992 |
|----|------------|----|---------|
| EP | 0604015    | *  | 6/1994  |
| EP | 0804015    |    | 6/1994  |
| EP | 1098249    |    | 5/2001  |
| EP | 1400894 A2 |    | 3/2004  |
| JP | 3282649    |    | 12/1991 |
| JP | 5233450    |    | 9/1993  |
| JP | 06-21488   |    | 5/1994  |
| JP | 7134634    |    | 5/1995  |
| JP | 10-154101  |    | 6/1998  |
| JP | 2000148584 |    | 5/2000  |
| JP | 2002278833 |    | 9/2002  |
| JP | 2003-228462|    | 8/2003  |
| JP | 2004054845 |    | 2/2004  |
| WO | 2004/031963|    | 4/2004  |

OTHER PUBLICATIONS

Ismail Ari et al., ACME: Adaptive Caching Using Multiple Experts, Proceedings in Informatics, vol. 14, Carleton Scientific, 2002 (16 pages).

(Continued)

*Primary Examiner* — Kaushikkumar Patel (57) ABSTRACT

Methods and systems for providing an alternative caching scheme at the storage area network level are disclosed. In one embodiment, it is determined that the number of accesses to a portion of data associated with a storage device exceeds a threshold that is greater than one access. A copy of the portion of data is associated with a caching resource that provides auxiliary caching for the storage device. The auxiliary caching resource is at the storage area network level. The copy of the portion of data is accessed instead of the portion of data for subsequent accesses.

22 Claims, 3 Drawing Sheets

(56) References Cited

OTHER PUBLICATIONS

Falconstor Software, FalconStor IPStor version 3.51 User Guide, 2003 (623 pages).

Nimrod Megiddo and Dharmendra S. Modha, ARC: A Self-Tuning, Lowoverhead Replacement Cache, 2nd USENIX Conference on File and Storage Technologies, 2003 (16 pages).

IBM TotalStorage Open Software Family for an on demand world, IBM TotalStorage SAN Volume Controller, 2004 (4 pages).

European Patent Office, PCT Search Report and Written Opinion of PCT/US2005/016647 dated Dec. 6, 2005 (13 pages).

* cited by examiner

```
┌─────────────────────────────────────────────┐
│  THE NUMBER OF ACCESSES TO A PORTION OF DATA │
│  ASSOCIATED WITH A STORAGE DEVICE EXCEEDS A  │
│   THRESHOLD THAT IS GREATER THAN ONE ACCESS. │
│                     292                      │
└─────────────────────────────────────────────┘
                      │
                      ▼
┌─────────────────────────────────────────────┐
│ A COPY OF THE PORTION OF DATA IS ASSOCIATED WITH AN │
│  AUXILIARY CACHE RESOURCE THAT PROVIDES AUXILIARY   │
│       CACHING FOR THE STORAGE DEVICE.               │
│                     294                      │
└─────────────────────────────────────────────┘
                      │
                      ▼
┌─────────────────────────────────────────────┐
│   THE COPY OF THE PORTION OF DATA IS ACCESSED │
│ INSTEAD OF THE PORTION OF DATA FOR SUBSEQUENT │
│                   REQUESTS.                   │
│                     296                      │
└─────────────────────────────────────────────┘
```

PROVIDING AN ALTERNATIVE CACHING SCHEME AT THE STORAGE AREA NETWORK LEVEL

TECHNICAL FIELD

Embodiments of the present invention relate to caching data. More specifically, embodiments of the present invention relate to providing an alternative caching scheme at the storage area network level to the caching scheme provided by a primary cache for a storage device.

BACKGROUND ART

As the use of computers has become more wide spread, large organizations and/or companies have acquired computers from a wide variety of platforms and/or models and networked these computers together. Computers from a wide variety of platforms and/or models are also known as heterogeneous computers. Storage area networks (SAN) were developed to provide storage for the heterogeneous computers by providing a high-speed network of shared storage devices. A SAN architecture, typically, makes all storage devices available to many of the computers in a large network, such as those associated with large organizations and/or companies. In this case, the SAN architecture may pool the storage devices, for example, to ease the management of the storage devices.

Various methods of increasing the I/O rates for accessing data between computers and storage devices have been developed. Frequently, storage devices provide different levels of access latency times, throughput expressed as Input/Output (I/O) rates, and/or transfer rates, for reading data from the storage devices and for writing data to the storage devices. Storage devices, such as caches, system memory, or solid state devices (SSD), that provide, for example, fast access latency, throughput, IO rates and/or transfer rates (referred to hereinafter as "fast storage devices") may be used to permanently or temporarily store data as it is being communicated between applications executing on computers and storage devices that provide, for example, slower access latency, throughput, IO rates and/or transfer rates (referred to hereinafter as "slower storage devices"). When an application requests to write data, the data may be stored first in fast storage devices and then later stored in the slower storage devices. When the data is written to the fast storage device the application is informed that the data has been stored and, therefore, does not have to wait until the data is actually stored on the slower storage device.

Many of these methods have been used to speed up the communication of data between computers, such as clients, and the storage devices over a SAN for the purpose of increasing I/O rates.

DISCLOSURE OF THE INVENTION

Embodiments of the present invention pertain to methods and systems for providing an alternative caching scheme at the storage area network level is described. In one embodiment, it is determined that the number of accesses to a portion of data associated with a storage device exceeds a threshold that is greater than one access. A copy of the portion of data is associated with a caching resource that provides auxiliary caching for the storage device. The auxiliary caching resource is at the storage area network level. The copy of the portion of data is accessed instead of the portion of data for subsequent accesses.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Figure 1:
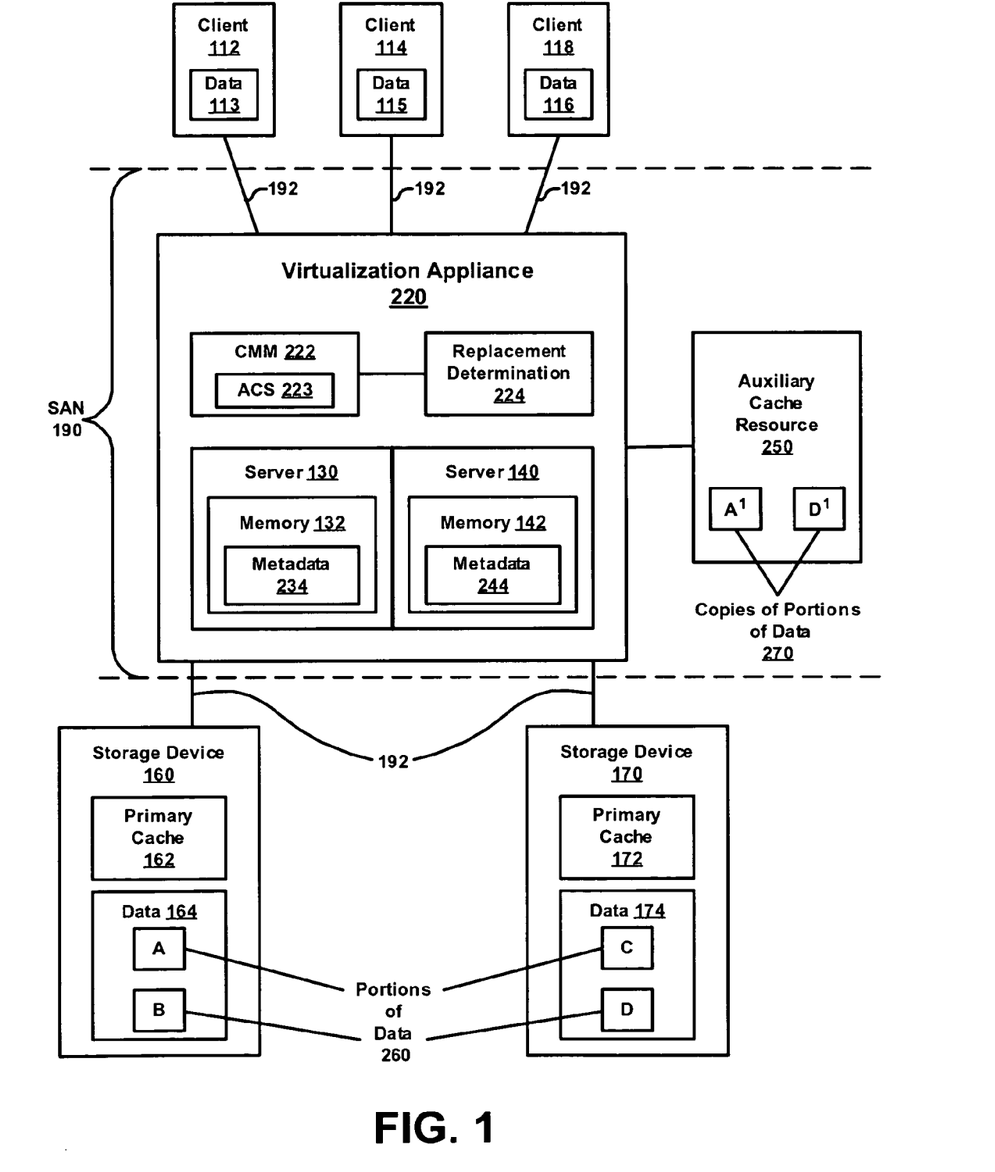
FIG. 1 is a block diagram of an exemplary system for providing an alternative caching scheme at the storage area network level, according to embodiments of the present invention.

Overview of Providing an Alternative Caching Scheme At the Storage Network Level FIG. 1 is a block diagram of a system for providing an alternative caching scheme at the storage area network level, according to one embodiment. The blocks in FIG. 1 can be arranged differently than as illustrated, and can implement additional or fewer features than what are described herein.

As depicted in FIG. 1, applications executing on computers, such as clients 112, 114, 118, communicate data to and/or from storage devices 160, 170 over a SAN 190. Data 113, 115, 116 associated with clients 112, 114, 118 may be stored at storage devices 160, 170 resulting in data 164, 174. Further, the stored data 164, 174 may be cached on primary caches 162, 172 respectively. Storage devices 160, 170 may be Redundant Arrays of Independent Disks (RAIDs), according to one embodiment. The auxiliary cache resource 250 is a part of the SAN 190 (e.g. "at the SAN level"), according to one embodiment. Primary caches 162, 172, according to one embodiment, may be array caches. FIG. 1 further depicts a virtualization appliance 220 that includes a cache management module (CMM) 222, an alternative caching scheme 223, a replacement determination 224, and metadata 234, 244.

According to one embodiment, the virtualization appliance 220 is an "in-band" virtualization appliance. According to another embodiment, a virtualization system may be either an in-band virtualization appliance or an out-of-band virtualization system. For an out-of-band virtualization system, metadata about the control of virtualization functionality is separated from data traffic and maintained by a metadata server. The hardware, such as virtualization appliance 220, and interconnects 192 that connect the computers, such as clients 112, 114, 118, to storage devices 160, 170 in a SAN 190 is referred to as SAN fabric.

The SAN fabric typically enables a many-to-many connectivity between the clients 112, 114, 118 and the storage devices 160, 170 associated with a SAN 190. Interconnects 192 may be Fibre Channel (FC) and/or Gigabit Ethernet (GigE), according to one embodiment.

The CMM 222 provides an alternative caching scheme 223 to that provided by the primary caches 162, 172 associated with storage devices 160, 170, according to one embodiment. For example, typically the caches 162, 172 associated with relatively slower storage devices 160, 170 use a caching scheme known as "demand based caching" where data is always written to the cache 162, 172 when the data is first accessed either by reading the data or writing the data. For example, if an application on client 112 requests to read data 164 from storage device 160 for the first time, the data 164 will be stored in the primary cache 162. Similarly, if an application on client 112 requests to write the data 113 for the first time, the data 113 will be stored in the primary cache 162 assuming that storage device 160 is selected for the data 113 to be written to.

In contrast to "demand based caching", CMM 222 provides an alternative caching scheme 223 by not allowing data to be cached in the auxiliary cache resource 250 until the number of access to the data has exceeded a threshold that is greater than one access, according to one embodiment. For example, the CMM 222 may determine that a portion of data associated with a storage device 160, such as portion of data A, has been accessed more than once. CMM 222 may "migrate" portions of data 260 to auxiliary cache resource 250 resulting in copies of portions of data 270. For example, a particular portion of data A may be "migrated" to auxiliary cache resource 250, for example, by associating a copy A' of that particular portion of data A with the auxiliary cache resource 250 in the event that the portion of data A has been accessed more than once. The copy A' will be accessed instead of the portion of data A for subsequent requests to access the portion of data A, according to another embodiment. In so doing, entities, such as applications executing on clients 112, 114, 118 may experience faster access times and/or greater I/O rates when accessing the copies of the portions of data 270, such as copy A', than when accessing portions of data 260, such as portion of data A. Although for the sake of simplicity the descriptions herein refer to accessing the portions of data 260 and/or the copies of the portions of data 270, any subset of the portions of data 260 and/or the copies of the portions of data 270 may be accessed.

The threshold may be static, according to another embodiment. For example, the threshold is statically set to a predetermined number of accesses, such as three and never modified thereafter. If a particular portion of data 260, such as portion of data A, is accessed three times, then that portion of data A may be migrated to auxiliary cache resource 250. Then if another portion of data 260, such as portion of data B, is accessed three times, the portion of data B may be migrated.

The threshold may be a dynamic threshold that is modified to adapt to changing circumstances over time, according to still another embodiment. For example, the threshold may be a cost to benefit ratio, such as a cost of migrating portions of data 260 versus a benefit of leaving copies of portions of data 270 resident in the auxiliary cache resource 250, according to an embodiment that will be described in more detail.

Storage devices 160, 170 typically include logic for detecting when an application associated with a client 112, 114, 118 requests to access data 164, 174 stored in the storage devices 160, 170 in a sequential manner. For example, the storage device 160, 170 can provide data that it has in its cache 162, 172 to the application faster than it can provide data 164, 174 that it has to read with its mechanical actuators. Therefore, if a storage device 160, 170 detects that an application executing on a client 112, 114, 118 is accessing its data 164, 174 sequentially, the storage device 160, 170 may anticipate that the application will continue to access the data 164, 174 sequentially and "pre-fetch" additional parts of its data 164, 174 and store the pre-fetched data in its cache 162, 172. Therefore, storage devices 160, 170 provide optimal transfer rates for sequential accesses to data 164, 174 stored in these storage devices 160, 170. For more information on using sequential accesses to optimize the transfer rates refer to "Maximizing Sequential Read Streams While Minimizing the Impact on Cache and Other Applications, U.S. Pat. No. 6,253,289 B1, by Bates, et al. the contents of which are incorporated herein.

According to another embodiment, CMM 222 provides an alternative caching scheme 223 by not allowing portions of data 260 to be cached in the auxiliary cache resource 250 in the event that the portions of data 260 are being accessed sequentially at the storage devices 160, 170. For example, if an application executing on client 114 is accessing portion of data B which is stored on storage device 160, the CMM 222 may detect that portion of data B is being accessed sequentially. In this case, CMM 222 may not allow portion of data B to be copied to auxiliary cache resource 250, thus, the application executing on client 114 will continue to access portion of data B on storage device 160 for subsequent accesses. The optimal transfer rates provided by the storage devices 160, 170 for sequential accesses to data 164, 174 will continue to be used. According to another embodiment, sequential accesses to portions of data 260 are counted as one access, for example, by the CMM 222, in the determination of access threshold for that portion of data, to avoid caching portions of data 260 in the auxiliary cache resource 250 that are being accessed sequentially at storage devices 160, 170.

Primary caches 162, 172 cache data 164, 174 in cache lines that are typically 1 kilobyte to 16 kilobyte in size. Typically, it is not practical to use a very large cache line for demand based caching, because there is no mechanism to select portions of data containing spatially localized access patterns. Therefore, it would result in poor utilization of the cache resource while adding overhead associated with handling data that may not be accessed. According to yet another embodiment, CMM 222 provides an alternative caching scheme 223 by caching portions of data 260 that are substantially larger than a cache line. In order for portions of data 260 to be cached on auxiliary cache resource 250, the portions of data 260 are "migrated" to auxiliary cache resource 250. Migration may be accomplished by selecting particular portions of data 260, such as portion of data A, reading the entire selected portion of data A, creating a copy A' of the selected portion of data A and migrating (for example by "associating") the copy A' to the auxiliary cache resource 250.

According to one embodiment, the size of the portions of data 260 are large enough for the storage devices 160, 170 to detect that the portions of data 260 are being accessed sequentially, for example, by an application executing on a client 112, 114, 118. As already described herein, storage devices 160, 170, such as RAIDs, may have logic that enables them to provide optimal transfer rates for data that is being accessed sequentially. Migrating portions of data 260 to auxiliary cache resource 250, as already described herein, may take advantage of the storage devices 160, 170 ability to optimize transfer rates for sequential accesses. To continue the example, the migration of portion of data A may be optimized when the storage device 160 detects that portion of data A is being accessed sequentially when it is being read to create the copy A'.

According to one embodiment, portions of data 260 are substantially larger than a cache line. According to another embodiment, the portions of data 160 are at least 128K in order to benefit from optimal transfer rates, for example, due to sequential access detection, as already described herein.

When a particular portion of data 260, such as portion of data B, is being migrated from the storage device 160 to auxiliary cache resource 250, other entities, such as applications executing on clients 112, 114, 118, are not allowed to access the data 164, 174 on storage device 160 in order to preserve consistency. The larger the portions of data 260 are, the longer it will take to migrate portion of data B to auxiliary cache resource 250 and the longer the other entities will have to wait. Therefore, the portions of data 260 may be large enough to allow storage devices 160, 170 to detect sequential accesses of these portions of data 260 but at the same time not so large as to cause entities, such as applications, substantial waiting time that are, for example, greater than normal disk access and transfer time during migration processing. According to one embodiment, the size of the portions of data 260 is small enough to be migrated to the auxiliary cache resource with out interfering with entities accessing data 164, 174 associated with a storage device 160, 170. According to another embodiment, the size of the portions of data 260 is less than 10 megabytes.

Providing an alternative caching scheme 223 results in the primary caches 162, 172 and the auxiliary cache resource 250 being used for different types of accesses thereby leveraging the primary caches 162, 172 and the auxiliary cache resource 250 for the types of access behavior that each is best suited for, according to an embodiment. For example, typically storage devices that have mechanical actuators and logic for detecting sequential accesses are relatively good at sequential accesses and relatively poor at random accesses. Storage devices that do not have mechanical actuators are relatively good at random accesses.

Therefore, according to one embodiment, data that is sequentially accessed is stored at the storage devices 160, 170, thus, utilizing the storage devices 160, 170 logic for detecting sequential accesses. Further, relatively small amounts data (e.g., the size of a cache line or smaller, for example) that are accessed randomly but have not exhibited sufficient access activity within a portion of data sufficient to cause migration to the auxiliary cache resource 250 are stored at storage devices 160, 170, such as RAIDs, and cached in the primary caches 162, 172, thus, minimizing the poor performance of the storage devices 160, 170 during random accesses.

In contrast, relatively large amounts of data (e.g., copies of portions of data 170 that range from approximately the size of a cache line to 10 megabytes, for example) that exhibit sufficient activity in their access patterns may be cached at auxiliary cache resources 250, such as SSDs, utilizing the auxiliary cache resource's 250 good performance when performing random accesses, according to one embodiment. According to one embodiment of the invention, exclusivity between the contents of the copies of portions of data 270 associated with the auxiliary cache resource 250 and the portions of data that are cached in the primary caches 162, 172 is promoted.

Virtualization

"Virtualization" is one part of providing a many-to-many connectivity between clients 112, 114, 118 and storage devices 160, 170 in such a way that allows physical entities, such as clients, applications, file systems, and storage devices, to not be aware of the physical characteristics of other physical entities. Further, virtualization allows for continuous data availability by providing multiple paths to data. In general, virtualization involves the renaming or remapping of one entity, such as a physical entity, to another entity, such as a logic entity. For example, the physical entities, such as storage devices 160, 170, may be partitioned into smaller pieces or grouped together into a logical entity, known as a Logical Unit and identified with a Logical Unit Number (LUN). Further, physical entities may be grouped according to LUNs. Also, individual LUNs may be associated with individual entities, such as a particular client, application, file system, or storage device.

LUNs may be mapped or "configured" to other LUNs through a virtualization appliance. For example, LUN X may be assigned to a particular storage device 160 and LUN Y assigned to storage device 170. These LUNs may be configured together or "pooled" by the virtualization appliance 220 to create a new LUN, for example LUN Z. LUN Z can then be mapped by the virtualization appliance 220 to a particular application that executes on client 114. Data from the application on client 114 will now be stored on storage devices 160 and 170.

Today, configuring LUNs, for example, at a conventional virtualization appliance is a manual process performed by a system administrator. Typically, the system administrator uses pre-existing knowledge of application requirements or profiling software suites to determine storage access patterns of data. Then the system administrator may configure the LUNs appropriately. For example, if the data for a particular application is accessed frequently, the system administrator may configure the LUN for that application to a storage device with a large cache. In contrast, if the particular application does not access its data frequently, then the system administrator may configure its LUN to a storage device that does not have a cache.

In another example, a particular application may access its data frequently, but the application may not be a response time-critical application, e.g., does not need an I/O operation to complete quickly. However, another application may access its data less frequently, but it is a time-critical application. With conventional systems, managing these applications is a manual process where a system administrator, for example, maps the LUN for the time-critical application to a fast storage device that can provide fast access time to its data and the LUN for the not time-critical application to a slower device or a different RAID configuration.

The cost of SSDs is continually decreasing and the cost of manually configuring LUNs remains expensive. The alternative caching scheme 223 automatically offloads work from the storage devices 160, 170 to an auxiliary cache resource 250, such as an SSD, without requiring manual intervention from a system administrator. According to one embodiment, the alternative caching scheme 223 can be enabled only for selected LUNs.

The virtualization appliance 220 may cache data in its system memory 132, 142 in addition to virtualizing, for example by "pooling", physical entities. Typically, a virtualization appliance 220 has at least two servers 130, 140. The virtualization appliance 220 may hold copies of data that applications executing on clients 112, 114, 118 operate on in system memory 132, 142 that is associated with the two servers 130, 140. Two exact copies of the same data may be held (also known as "mirroring") in system memory 132 and system memory 142.

Metadata

In general, metadata is data that describes data, for example where the data is stored and how it is accessed. Metadata 234, 244 associated with the CMM 222 functionality describes which portions of the data 164, 174 have been migrated to the auxiliary cache resource 250 and allows the virtualization appliance 220 to access the data from the appropriate location, either storage devices 160, 170 or auxiliary cache resource 250, according to one embodiment. Metadata 234, 244 associated with the CMM 222 functionality also describes statistics associated with portions of data 260, according to another embodiment. For example, in this case, metadata 234, 244 may be used for determining whether the number of accesses to the portions of data 260 have reached a threshold, among other things. Metadata 234, 244 may describe statistics associated with copies of portions of data 270 in addition to or instead of statistics associated with portions of data 260, according to another embodiment. In this case, the metadata 234, 244 may be used to compute a dynamic threshold using a cost to benefit ratio, as will be described herein.

According to one embodiment, metadata 234, 244 is held and mirrored in the virtualization appliance 220 in memories 132, 142, as well as stored in stable storage. The in memory copy provides high-speed response, while the stable copy guarantees reliability and recovery after failures. For example, one copy of metadata 234 may be stored in the system memory 132 of one of the servers 130 associated with virtualization appliance 220 and an exact copy of the metadata 244 may be held in the system memory 142 of the other server 140 associated with the virtualization appliance 220. "Mirroring" the metadata 234, 244 provides improved availability and disaster recovery of the metadata 234, 244, according to one embodiment. "Mirroring" the metadata 234, 244 does not involve an undue amount of overhead since the size of the metadata 234, 244 is manageable.

The Replacement Determination

A replacement determination 224 is used for determining which copies of the portions of data 270 will be removed from auxiliary cache resource 250, according to one embodiment in order to preferentially migrate more valuable portions of data 270 to the auxiliary cache resource 250. Replacement determination 224 may use an existing replacement determination, such as Least Recently Used (LRU), Adaptive Replacement Cache (ARC), or Adaptive Caching using Multiple Experts (ACME), according to another embodiment.

For a description of ACME, refer to "ACME: adaptive caching using multiple experts" by I. Ari, et al, in the Proceedings in Informatics, volume 14, pages 143-158, Carleton Scientific, 2002, the contents of which are incorporated herein. For a description of ARC, refer to "ARC: A self-tuning, low overhead replacement cache" by N. Megiddo et al. in the Proceedings of the 2003 Conference on File and Storage Technologies (FAST), pages 114-130, San Francisco, Calif., March 2003, the contents of which are incorporated herein.

According to still another embodiment, replacement determination 224 may use a new replacement determination. For example, replacement determination 224 may use a cost to benefit ratio, as described herein, to determine what copies of portions of data 270 will be removed from auxiliary cache resource 250. According to yet another embodiment, auxiliary cache resource 250 may use a new replacement determination, such as the cost to benefit ratio as already described herein, to augment an existing replacement determination.

Dynamic Thresholds

As already stated, the threshold may be a dynamic threshold that is adjusted to adapt to changing circumstances over time, according to another embodiment. Further, the threshold may be a dynamic cost to benefit ratio, according to still another embodiment. For example, a dynamic threshold can be based at least in part on a cost of associating a copy of a portion of data with the auxiliary caching resource that is weighted against a benefit of allowing a copy of another portion of data to continue to be associated with the auxiliary caching resource, according to one embodiment.

More specifically, there is a cost associated with migrating a particular portion of data C to the auxiliary cache resource 250 in terms of the system resources that will be used for the migration. Further, in order to migrate a portion of data C to auxiliary cache resource 250, something that is already in the auxiliary cache resource 250, such as either a copy of portion of data A' or D', may have to be removed from the auxiliary cache resource 250. Therefore, the benefit that may have resulted if a copy A', D' were allowed to remain in the auxiliary cache resource 250 will no longer continue when the copy A', D' is removed from the auxiliary cache resource 250. Therefore, according to one embodiment, the cost of associating a portion of data C may be weighted against the benefit of allowing a copy of another portion of data 270, such as A' or D', to continue to reside in the auxiliary caching resource 250. Further the costs and benefits change over time and as a function of the workload resulting in a dynamic threshold that may be adjusted to reflect these changing costs and benefits.

By dynamically adjusting the threshold, more portions of data 260 may be migrated when the benefits can be maximized and fewer portions of data 260 are migrated when costs outweigh the benefits. Table 1 below depicts a sample of pseudo code for dynamically adjusting the threshold based on a cost to benefit ratio, according to one embodiment.

TABLE 1 sample pseudo code for a dynamic threshold.

| Line No. | Sample code |
| --- | --- |
| 1 | Initialize: PrevMetric = 0 |
| 2 | PrevDelta = 0 |
| 3 | |
| 4 | Metric = Total Hits/NumberOf MigratedPortionsOfData |
| 5 | DeltaMetric = Metric − PrevMetric |
| 6 | If (DeltaMetric > PrevDelta) |
| 7 | Threshold −= Constant |
| 8 | Else |
| 9 | Threshold += Constant |
| 10 | PrevMetric = Metric |
| 11 | PrevDelta = DeltaMetric |

As depicted in Table 1, on line 4 the "TotalHits" is the total, e.g., cumulative, number of "hits" (also known as "accesses") to all the copies of portions of data 270 (A' and D') associated with the auxiliary cache resource 250, according to one embodiment. The CMM 22 may start to accumulate the "TotalHits" for a specific LUN when the specific LUN is enabled, according to yet another embodiment. The "NumberOfMigratedPortionsOfData" may be a cumulative count of all the portions of data 260 that have been "migrated" to the auxiliary cache resource 250, according to one embodiment. A particular portion of data 260, such as portion of data A, may be counted as migrating to auxiliary cache resource 250 twice in the event that it is migrated, evicted, and migrated again, according to another embodiment.

The "Metric" is calculated by dividing "TotalHits", a benefit, by the "NumberOfMigratedPortionsOfData", a cost, on line 4, according to one embodiment. For example, as depicted in FIG. 1, two portions of data 260 have been migrated to auxiliary cache resource 250 resulting in copies of portions of data A' and D'. If A' and D' have been accessed or "hit" 500 times, then "Metric" will be 500/2 which is 250.

Lines of code 6 to 9 are used to determine if the "Metric" associated with caching copies the portions of data 270 is increasing or decreasing. If the "Metric" is increasing, then the "Threshold" is decreased by a constant on line 7 in order to "migrate" more portions of data 260 to the auxiliary cache resource 250, resulting in more of the copies of portions of data 270 being associated with the auxiliary cache resource 250. However, if the "Metric" is decreasing, then the "Threshold" is increased by a constant on line 9 in order to slow the migration of portions of data 260 to the auxiliary cached resource 250. Migrating more portions of data 260 may result in removing more of the copies of portions of data 270 from the auxiliary cache resource 250.

Operational Examples

Figure 2:
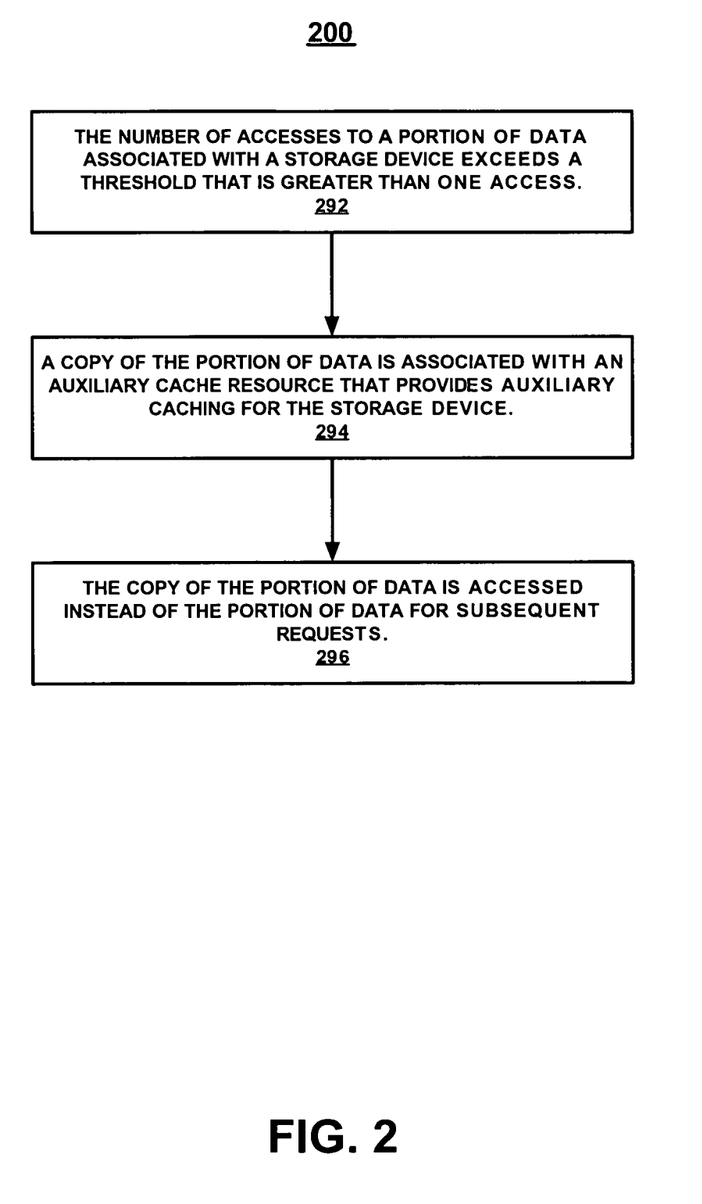
FIG. 2 depicts flowchart 200 for providing an alternative caching scheme at the storage network level, according to embodiments of the present invention.

FIG. 2 depicts flowchart 200 for providing an alternative caching scheme at the storage network level, according to embodiments of the present invention. Although specific steps are disclosed in flowchart 200, such steps are exemplary. That is, embodiments of the present invention are well suited to performing various other steps or variations of the steps recited in flowchart 200. It is appreciated that the steps in flowchart 200 may be performed in an order different than presented, and that not all of the steps in flowchart 200 may be performed. All of, or a portion of, the embodiments described by flowchart 200 can be implemented using computer-readable and computer-executable instructions which reside, for example, in computer-usable media of a computer system or like device.

For the purposes of illustration, the discussion of flowchart 200 shall refer to the structures depicted in FIG. 1. For the following operational example, assume that the LUN for a particular application X is enabled. In step 292, the number of accesses to a portion of data associated with a storage device exceeds a threshold that is greater than one access, according to one embodiment. For example, the application X that is executing on client 114 may write data 115 to storage device 160. As a result, writing data 115 may result in a portion of data A being stored on storage device 160. Some time later, for example, the application X may need to read the portion of data A. Typically, at this point in time, data 115 will have been removed from the system memory associated with client 114 and no longer be available to the client 114. The application X may obtain its data by accessing portion of data A on storage device 160. As application X processes portion of data A, CMM 222 may determine that portion of data A on storage device 160 has been accessed beyond a threshold, which in this operational example is one access.

In step 294, a copy of the portion of data is associated with an auxiliary cache resource that provides auxiliary caching for the storage device, according to another embodiment. For example, the CMM 222 may migrate the portion of data A to the auxiliary cache resource 250 by associating a copy A' with the auxiliary cache resource 250.

Statistics, such as the number of accesses to portion of data A may be stored in metadata 234, 244. The metadata 234, 244 may be used in determining when a threshold has been exceeded for a portion of data A and therefore a copy A' of that portion of data A is to be associated with the auxiliary cache resource 250.

In step 296, the copy of the portion of data on the auxiliary cache resource is accessed instead of the portion of data on the storage device for subsequent requests, according to yet another embodiment. For example, as application X continues to execute, application X may process its data by accessing the copy A' on the auxiliary cache resource 250 instead of portion of data A on storage device 160. Application X may execute more quickly because the I/O rate between auxiliary cache resource 250 and client 114 is faster than the I/O rate between storage device 160 and client 114 or because the response time to client 114 of the auxiliary cache resource 250 is faster than the response time of storage device 160.

Although the above operational example assumed that all of portion of data A was from data 115 other possibilities exist. For example, portion of data A may be from a subset of data 115, a subset of data 113 and data 116, etc.

Figure 3:
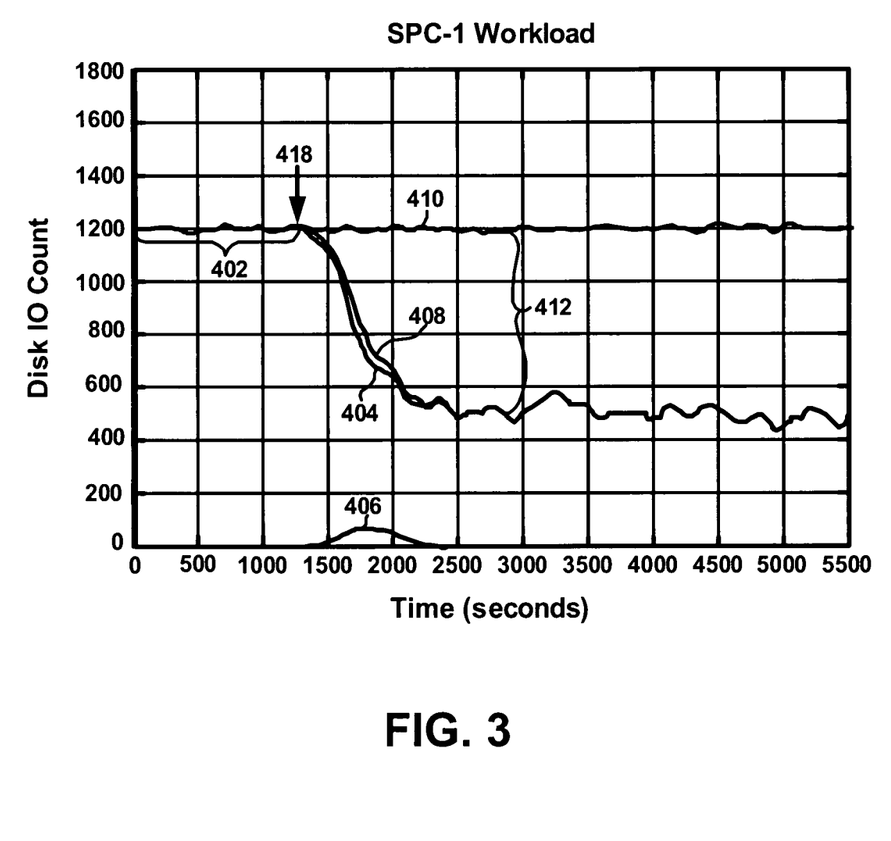
FIG. 3 is a graph depicting the number of I/Os that can be saved by providing an alternative caching scheme at the storage area network level, according to embodiments of the present invention.

FIG. 3 is a graph depicting the number of I/Os that can be reduced at the storage device providing an alternative caching scheme at the storage area network level, according to embodiments of the present invention. More specifically, FIG. 3 depicts time in seconds verses disk I/O count in I/O's per second while running the Storage Performance Council's SPC-1 benchmark workload to access portions of data. For the purposes of illustration, assume that a particular LUN is associated with and only with an application that is accessing portions of data 260, depicted in FIG. 1. Further, assume that this LUN is enabled.

The SPC-1 benchmark workload in this example is configured to result in a constant 1200 I/Os 410 for the enabled LUN. The CMM 222 is not enabled for approximately the first 1200 seconds 402 that the workload is running. Therefore, the CMM 222 is not collecting statistics on the initial disk I/Os during the first 1200 seconds 402 to portions of data 260. After approximately the first 1200 seconds 402, the CMM 222 is enabled and it begins to collect statistics on how often portions of data 260 are accessed. The statistics may be stored in metadata 234, 244.

In step 292, the number of accesses to a portion of data associated with a storage device exceeds a threshold that is greater than one access, according to one embodiment. As portions of data 260 are accessed, the CMM 222 determines that the portions of data 260 have been accessed beyond a certain threshold. For the purposes of illustrating this operational example of FIG. 3, the threshold shall be a static threshold of 16 accesses and the size of the portions of data 260 is 128 kilobytes.

In step 294, a copy of the portion of data is associated with an auxiliary cache resource that provides auxiliary caching for the storage device, according to another embodiment. For example, portions of data 260 that have been accessed more than the threshold start to be migrated (refer to reference number 418) to the auxiliary cache resource 250 resulting in copies of portions of data 270 being associated with the auxiliary cache resource 250. Migration I/Os 406 are used to "migrate" portions of data 260 to the auxiliary cache resource 250.

In step 296, the copy of the portion of data on the auxiliary cache resource is accessed instead of the portion of data on the storage device for subsequent requests, according to yet another embodiment. As copies of portions of data 270 are associated with the auxiliary cache resource 250, the copies of portions of data 270 are accessed instead of the portions of data 260 resulting in a reduction in disk I/Os 404. The total Disk I/Os 408 is the total of the reduced disk I/Os 404 plus the migration I/Os 406.

Conclusion

By providing an alternative caching scheme 223 and an auxiliary caching resource 250, embodiments of the present invention greatly reduce the workload of storage devices 160, 170. For example FIG. 3 depicts that the I/O rate to a storage device 160, 170 was reduced by 58% (approximately 700 I/Os per second) from approximately 1200 to approximately 500 for a LUN in an I/O intensive application benchmark (412). Further, the number of migration I/Os 406 is extremely small (approximately 100) but results in a large reduction in I/Os 412 to the storage device 160, 170 (e.g., approximately 700).

By reducing the workload of the storage devices 160, 170, embodiments of the present invention decrease the I/O rate to the storage devices 160, 170 thus, reducing the queue length and the wait time for the storage devices 160, 170, resulting in better access performance for the data 164, 174 on the storage devices 160, 170.

By reducing the workload of the storage devices 160, 170 using embodiments of the present invention, the sequential I/O streams which are maintained primarily by the storage devices 160, 170 experience decreased contention leading to more efficient sequential accesses.

By providing a static threshold, embodiments of the present invention reduce the workload of storage devices 160, 170.

By providing a dynamic threshold, embodiments of the present invention not only reduce the workload of storage devices 160, 170 but may also detect and adjust to the changing needs of clients, applications, etc.

Embodiments of the present invention are easy to implement with legacy systems. For example, a cache management module 222 may be easily installed in a virtualization appliance 220 without requiring any changes to the storage devices 160, 170, or clients 112, 114, 118.

Embodiments of the present invention result in an architecture that is scalable. For example, it is easy to add more auxiliary cache resources 250, such as SSDs, to a system such as that depicted in FIG. 1. Auxiliary cache resources 250 can be increased independently of overall storage capacity. Embodiments of the present invention allow for using separate auxiliary cache resources, such as SSDs, to augment the caching capacity available to relatively slower storage devices, such as RAIDs.

By providing an alternative caching scheme, embodiments of the present invention provide for reducing the amount of manual intervention required for administration of storage configurations such as setting up and maintaining the auxiliary cache resources.

Providing an alternative caching scheme 223 results in the primary caches 162, 172 and the auxiliary cache resource 250 being used for different types of access behavior, according to an embodiment. For example, the auxiliary cache resource 250 may be primarily used for random accesses within relatively large portions of data 260 (e.g., portions of data 260 that range from approximately 128K to 10 megabytes, for example), whereas, the primary caches 162, 172 may be primarily used for sequential accesses and for randomly accessing relative small amounts of data 260 that are, for example, the size of a cache line and which are not suitable for migration to the auxiliary cache resource 250. Providing an alternative caching scheme 223 results in leveraging the primary caches 162, 172 and the auxiliary cache resource 250 for the types of access behavior that each is best suited for, according to an embodiment. Further, providing an alternative caching scheme 223 results in optimizing the use of expensive resources such as caches 162, 174, storage devices 160, 170 and virtualization appliances 220. For example, providing an alternative caching scheme 223 results in significantly improved performance (refer to FIG. 3 and the accompanying description) under dynamic workload conditions while reducing the need for manual system administration and reconfiguration.

Extensions and Alternatives

Although certain embodiments of the present invention were described using an SSD for the auxiliary cache resource 250, the present invention is not limited to an SSD. For example, the auxiliary cache resource 250 may be, among other things, a disk array, such as a RAID, battery-backed Dynamic Random Access Memory (DRAM), Magnetic Random Access Memory (MRAM), Flash, or any type of device that can be used to temporarily and/or permanently store data.

Although certain embodiments of the present invention were described with the CMM 222 implemented in an appliance, such as a virtualization appliance 220, CMM 222 may reside in any or in a combination of an appliance 220, a fabric switch, a disk array, such as storage devices 160, 170, or another computer, such as clients 112, 114, 118. For example, CMM 222 may reside in storage device 160 instead of appliance 220. In a second example, CMM 222 may reside in client 114 instead of appliance 220. In a third example, part of CMM 222 may reside in appliance 220 and part of CMM 222 in storage device 160, etc. In the event that parts of the CMM 222 reside on different devices, controlling logic may be used for the various parts to communicate.

Although certain embodiments of the present invention were described with a virtualization appliance managing one auxiliary cache resource, the embodiments herein may pertain to a virtualization appliance managing more than one auxiliary cache resource. In this case, the virtualization appliance may maintain metadata for all of the auxiliary cache resources associated with it.

Although certain embodiments of the present invention were described using an auxiliary cache resource 250 solely for caching copies of portions of data 270, the auxiliary cache resource 250 may be used for other purposes in addition to caching copies of portions of data 270 as well.

The embodiments described herein may be used with mirroring the copies of the portions of data 270. For example, there may be two copies of A' and two copies of B'. These mirrored copies may be in one auxiliary cache resource or in different auxiliary cache resources.

Embodiments of the present invention are thus described. While the present invention has been described in particular embodiments, it should be appreciated that the present invention should not be construed as limited by such embodiments, but rather construed according to the following claims.

What is claimed is:

1. A method of providing an auxiliary caching scheme at a storage area network level, the method comprising:
   determining that a number of accesses to a portion of data in a storage device reaches a threshold that is greater than one access, the storage device including a primary cache to cache the data according to a first caching scheme;
   storing a copy of said portion of data in an auxiliary cache in response to the number of accesses to said portion of data reaching said threshold, wherein said auxiliary cache is at said storage area network (SAN) level and is external of the storage device, and wherein said auxiliary cache employs a second caching scheme that is different from the first caching scheme;
   for subsequent accesses to said portion of data, accessing said copy of said portion of data instead of accessing said portion of data; and
   dynamically vary said threshold based on a number of cache hits to copies of portions of data in said auxiliary cache, and a number of migrations of portions of data to said auxiliary cache.

2. The method as recited in claim 1, wherein a size of said portion of data is larger than a size of a cache line of said primary cache.

3. The method as recited in claim 2, wherein the size of said portion of data is at least 128K.

4. The method as recited in claim 2, wherein the size of said portion of data is large enough for said storage device to detect sequential accesses to said portion of data.

5. The method as recited in claim 1, further comprising:
   determining that a second portion of data is being accessed sequentially at said storage device; and
   not storing a copy of said second portion of data in said auxiliary cache because said portion of data is being accessed sequentially.

6. The method as recited in claim 5, wherein not storing said copy of said second portion of data in said auxiliary cache further comprises:
   counting sequential accesses to said second portion of data as one access.

7. A method of providing an auxiliary caching scheme at a storage area network level, the method comprising:
   determining that a number of accesses to a portion of data stored in a storage device reaches a threshold that is greater than one access;
   storing a copy of said portion of data in an auxiliary cache for said storage device in response to the number of accesses to said portion of data reaching said threshold, the storage device associated with a primary cache in addition to said auxiliary cache, wherein said auxiliary cache is at said storage area network (SAN) level;
   wherein said threshold is a dynamic threshold based at least in part on a cost of storing said copy of said portion of data in said auxiliary cache, wherein said cost is weighted against a benefit of allowing a copy of another portion of data to continue to be stored in said auxiliary cache, wherein the cost is based on a number of migrations of portions of data to said auxiliary cache, and the benefit is based on a number of cache hits to copies of portions of data in said auxiliary cache; and
   for subsequent accesses to said portion of data, accessing said copy of said portion of data instead of accessing said portion of data.

8. The method as recited in claim 7, further comprising storing said copy of said portion of data in the auxiliary cache if the number of accesses to said portion of data exceeds the threshold.

9. The method as recited in claim 7, further comprising not storing said copy of said portion of data in the auxiliary cache if the number of accesses to said portion of data does not reach the threshold.

10. The method as recited in Claim 7, further comprising:
    computing a metric based on a ratio between a value representing the cost and a value representing the benefit; and
    dynamically changing said threshold based on the computed metric.

11. The method as recited in claim 10, further comprising:
    determining whether the computed metric has increased or decreased with request to a previous value of the metric;
    modifying said threshold in a first manner in response to determining that the computed metric has increased with respect to the previous value of the metric; and
    modifying said threshold in a second, different manner in response to determining that the computed metric has decreased with respect to the previous value of the metric.

12. A system for providing an auxiliary caching scheme at a storage area network level, the system comprising:
    a storage device including a primary cache;
    an auxiliary cache at the storage area network level and external of said storage device;
    a cache management module to determine that a number of accesses to a portion of data in said storage device reaches a threshold that is greater than one access;
    said cache management module to cause a copy of said portion of data to be stored in said auxiliary cache in response to the number of accesses to said portion of data reaching said threshold;
    for subsequent accesses to said portion of data, said cache management module to cause said copy of said portion of data to be accessed instead of accessing said portion of data; and
    said cache management module is to dynamically vary said threshold by:
        computing a metric based on a first value that represents a number of cache hits to copies of portions of the data in said auxiliary cache, and a second value that represents a number of migrations of portions of the data to said auxiliary cache; and
        modifying said threshold according to the computed metric.

13. The system of claim 12, wherein said auxiliary cache is one of a solid state device (SSD), a disk array, Dynamic Random Access Memory (DRAM), Magnetic Random Access Memory (MRAM), and Flash Memory.

14. The system of claim 12, wherein said cache management module resides at least in part on a virtualization system.

15. The system of claim 12, wherein said storage device is a disk array.

16. The system of claim 12, wherein said cache management module is configured to maintain metadata describing statistics for one or more of said portion of data and said copy of said portion of data.

17. The system as recited in claim 12, wherein the modifying includes:
    modifying said threshold in a first manner in response to determining that the computed metric has increased with respect to a previous value of the metric, and modifying said threshold in a second, different manner in response to determining that the computed metric has decreased with respect to the previous value of the metric.

18. A non-transitory computer-readable medium having computer-readable program code embodied therein for causing a computer to:
  determine that a number of accesses to a portion of data in a storage device reaches a threshold that is greater than one access, said storage device including a primary cache and associated with an auxiliary cache that is external of said storage device;
  store a copy of said portion of data in said auxiliary cache for said storage device in response to the number of accesses to said portion of data reaching said threshold, wherein said auxiliary cache is at a storage area network (SAN) level;
  for subsequent accesses to said portion of data, access said copy of said portion of data instead of accessing said portion of data; and
  dynamically vary said threshold by:
    computing a metric based on a first value that represents a number of cache hits to copies of portions of the data in said auxiliary cache, and a second value that represents a number of migrations of portions of the data to said auxiliary cache; and
    modifying said threshold according to the computed metric.

19. The computer-readable medium of claim 18, wherein a size of said portion of data is larger than a size of a cache line associated with said primary cache.

20. The computer-readable medium of claim 18 having further instructions to:
  determine that a second portion of data is being accessed sequentially at said storage device; and
  not store a copy of said second portion of data in said auxiliary cache because said portion of data is being accessed sequentially.

21. The computer-readable medium of claim 20 wherein the instructions not to store said copy of said second portion of data in said auxiliary cache further comprises instructions to:
  count sequential accesses to said second portion of data as one access.

22. The computer-readable medium of claim 18, wherein the modifying of said threshold comprises:
  modifying said threshold in a first manner in response to determining that the computed metric has increased with respect to a previous value of the metric; and
  modifying said threshold in a second, different manner in response to determining that the computed metric has decreased with respect to the previous value of the metric.

* * * * *